(12) United States Patent
Oestlien et al.

(10) Patent No.: US 9,569,523 B2
(45) Date of Patent: *Feb. 14, 2017

(54) BUNDLE GENERATION

(71) Applicant: Google Inc., Mountain View, CA (US)

(72) Inventors: Christian Oestlien, New York, NY (US); Aaron Lee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/737,773

(22) Filed: Jun. 12, 2015

(65) Prior Publication Data
US 2015/0278344 A1    Oct. 1, 2015

Related U.S. Application Data

(63) Continuation of application No. 11/842,732, filed on Aug. 21, 2007, now Pat. No. 9,064,024.

(51) Int. Cl.
G06F 17/30    (2006.01)

(52) U.S. Cl.
CPC ..... G06F 17/30598 (2013.01); G06F 17/3089 (2013.01)

(58) Field of Classification Search
CPC ............ G06F 17/30038; G06F 17/3053; G06F 17/30616; G06Q 30/0251; G06Q 30/0241
USPC .............. 707/731, 748, 944; 705/14.4, 14.49
See application file for complete search history.

(56) References Cited

U.S. PATENT DOCUMENTS

| | | | |
|---|---|---|---|
| 5,649,060 A | 7/1997 | Ellozy | |
| 5,664,227 A | 9/1997 | Mauldin et al. | |
| 5,724,521 A | 3/1998 | Dedrick | |
| 5,740,549 A | 4/1998 | Reilly et al. | |
| 5,848,397 A | 12/1998 | Marsh et al. | |
| 5,946,658 A | 8/1999 | Miyazawa et al. | |
| 5,948,061 A | 9/1999 | Merriman | |
| 6,026,368 A | 2/2000 | Brown et al. | |
| 6,044,376 A | 3/2000 | Kurtzman, II | |
| 6,078,914 A | 6/2000 | Redfern | |
| 6,091,416 A | 7/2000 | Cragun | |

(Continued)

FOREIGN PATENT DOCUMENTS

| | | |
|---|---|---|
| CN | 1728781 | 2/2006 |
| CN | 102112009 | 6/2011 |

(Continued)

OTHER PUBLICATIONS

Korean Office Action in Korean Application No. 10-2009-7007416, mailed Mar. 10, 2014, 13 pages (with English translation).

(Continued)

*Primary Examiner* — Robert Beausoliel, Jr.
*Assistant Examiner* — Alexandria Bromell
(74) *Attorney, Agent, or Firm* — Fish & Richardson P.C.

(57) ABSTRACT

First topics related to a content page, such as a web page, are identified. Thereafter, second topics related to a first content element, such as advertisements, and a second content element, such as media files, are identified based on the first topics. Common topics are identified that are common to the first and second topics. Based on the common topics, first and second content elements are identified and combined in a bundle that is transmitted to a user requesting the content page.

20 Claims, 11 Drawing Sheets

(56) References Cited

U.S. PATENT DOCUMENTS

| | | |
|---|---|---|
| 6,144,944 A | 11/2000 | Kurtzman, II et al. |
| 6,167,382 A | 12/2000 | Sparks et al. |
| 6,188,398 B1 | 2/2001 | Collins-Rector et al. |
| 6,269,361 B1 | 7/2001 | Davis et al. |
| 6,282,548 B1 | 8/2001 | Burner et al. |
| 6,282,713 B1 | 8/2001 | Kitsukawa et al. |
| 6,393,158 B1 | 5/2002 | Gould et al. |
| 6,401,075 B1 | 6/2002 | Mason et al. |
| 6,615,270 B2 | 9/2003 | Gould et al. |
| 6,621,980 B1 | 9/2003 | Gould et al. |
| 6,698,020 B1 | 2/2004 | Zigmond et al. |
| 6,771,290 B1 | 8/2004 | Hoyle |
| 6,847,977 B2 | 1/2005 | Abajian |
| 6,976,028 B2 | 12/2005 | Fenton et al. |
| 6,978,470 B2 | 12/2005 | Swix et al. |
| 6,985,882 B1 | 1/2006 | Del Sesto |
| 6,990,496 B1 | 1/2006 | McGee, III et al. |
| 6,996,564 B2 | 2/2006 | Lester et al. |
| 7,039,599 B2 | 5/2006 | Merriman |
| 7,043,746 B2 | 5/2006 | Ma |
| 7,055,103 B2 | 5/2006 | Lif |
| 7,058,963 B2 | 6/2006 | Kendall et al. |
| 7,136,875 B2 | 11/2006 | Anderson et al. |
| 7,158,966 B2 | 1/2007 | Brill et al. |
| 7,158,986 B1 | 1/2007 | Oliver et al. |
| 7,165,069 B1 | 1/2007 | Kahle et al. |
| 7,181,447 B2 | 2/2007 | Curtis et al. |
| 7,194,527 B2 | 3/2007 | Drucker et al. |
| 7,266,198 B2 | 9/2007 | Medvinsky |
| 7,383,258 B2 | 6/2008 | Harik et al. |
| 7,454,509 B2 | 11/2008 | Boulter et al. |
| 7,467,218 B2 | 12/2008 | Gould et al. |
| 7,506,356 B2 | 3/2009 | Gupta et al. |
| 7,555,557 B2 | 6/2009 | Bradley et al. |
| 7,559,017 B2 | 7/2009 | Datar et al. |
| 7,584,490 B1 | 9/2009 | Schlack |
| 7,593,965 B2 | 9/2009 | Gabriel |
| 7,613,691 B2 | 11/2009 | Finch |
| 7,630,021 B2 | 12/2009 | Matsuzaka et al. |
| 7,657,519 B2 | 2/2010 | Anderson et al. |
| 7,769,819 B2 | 8/2010 | Lerman et al. |
| 7,806,329 B2 | 10/2010 | Dmitriev et al. |
| 7,809,802 B2 | 10/2010 | Lerman et al. |
| 7,853,601 B2 | 12/2010 | Kadambi et al. |
| 7,895,076 B2 * | 2/2011 | Kutaragi .............. A63F 13/77 |
| | | 705/14.4 |
| 7,912,217 B2 | 3/2011 | Baugher et al. |
| 7,937,724 B2 | 5/2011 | Clark et al. |
| 7,966,632 B1 | 6/2011 | Pan et al. |
| 7,986,372 B2 | 7/2011 | Ma et al. |
| 8,041,601 B2 | 10/2011 | Fikes et al. |
| 8,132,202 B2 | 3/2012 | Swix et al. |
| 8,156,010 B2 | 4/2012 | Gopalakrishnan |
| 8,156,176 B2 | 4/2012 | Lerman et al. |
| 8,196,166 B2 | 6/2012 | Roberts et al. |
| 8,243,017 B2 | 8/2012 | Broderson et al. |
| 8,243,203 B2 | 8/2012 | Suh |
| 8,433,611 B2 | 4/2013 | Lax et al. |
| 8,667,532 B2 | 3/2014 | Heath |
| 8,689,251 B1 | 4/2014 | Heath |
| 8,719,865 B2 | 5/2014 | Moonka et al. |
| 2001/0003214 A1 | 6/2001 | Shastri et al. |
| 2002/0002525 A1 | 1/2002 | Arai et al. |
| 2002/0065813 A1 | 5/2002 | Scanlon et al. |
| 2002/0116716 A1 | 8/2002 | Sideman |
| 2002/0147782 A1 | 10/2002 | Dimitrova et al. |
| 2003/0061305 A1 | 3/2003 | Copley et al. |
| 2003/0126472 A1 | 7/2003 | Banzhof |
| 2003/0154128 A1 | 8/2003 | Liga et al. |
| 2003/0188308 A1 | 10/2003 | Kizuka |
| 2004/0059708 A1 | 3/2004 | Dean et al. |
| 2004/0133469 A1 | 7/2004 | Chang |
| 2004/0133910 A1 | 7/2004 | Gordon et al. |
| 2004/0226038 A1 | 11/2004 | Choi |
| 2004/0243604 A1 * | 12/2004 | Gross .................... G06Q 10/06 |
| | | 707/707 |
| 2004/0267806 A1 | 12/2004 | Lester et al. |
| 2005/0028190 A1 | 2/2005 | Rodriguez et al. |
| 2005/0034151 A1 | 2/2005 | Abramson |
| 2005/0091311 A1 | 4/2005 | Lund et al. |
| 2005/0114198 A1 | 5/2005 | Koningstein et al. |
| 2005/0120127 A1 | 6/2005 | Bradley et al. |
| 2005/0207442 A1 | 9/2005 | Zoest et al. |
| 2006/0013555 A1 | 1/2006 | Poslinski |
| 2006/0015904 A1 | 1/2006 | Marcus |
| 2006/0026628 A1 | 2/2006 | Wan et al. |
| 2006/0053470 A1 | 3/2006 | Colter et al. |
| 2006/0059510 A1 | 3/2006 | Huang et al. |
| 2006/0090182 A1 | 4/2006 | Horowitz et al. |
| 2006/0106709 A1 | 5/2006 | Chickering et al. |
| 2006/0129533 A1 | 6/2006 | Purvis |
| 2006/0140584 A1 | 6/2006 | Ellis et al. |
| 2006/0179453 A1 | 8/2006 | Kadie et al. |
| 2006/0195318 A1 | 8/2006 | Stanglmayr |
| 2006/0214947 A1 | 9/2006 | Boose et al. |
| 2006/0221222 A1 | 10/2006 | Hirasawa |
| 2006/0224496 A1 | 10/2006 | Sandholm et al. |
| 2006/0224693 A1 | 10/2006 | Gaidemak et al. |
| 2006/0242013 A1 * | 10/2006 | Agarwal ................ G06Q 30/02 |
| | | 705/14.49 |
| 2006/0259588 A1 | 11/2006 | Lerman et al. |
| 2006/0259589 A1 | 11/2006 | Lerman et al. |
| 2006/0271977 A1 | 11/2006 | Lerman et al. |
| 2006/0277567 A1 | 12/2006 | Kinnear |
| 2007/0027750 A1 * | 2/2007 | Chou .................. G06Q 30/0257 |
| | | 705/14.55 |
| 2007/0073579 A1 | 3/2007 | Immorlica et al. |
| 2007/0078708 A1 | 4/2007 | Yu et al. |
| 2007/0078709 A1 | 4/2007 | Rajaram |
| 2007/0079331 A1 * | 4/2007 | Datta .................... A63F 13/12 |
| | | 725/42 |
| 2007/0089127 A1 | 4/2007 | Flickinger et al. |
| 2007/0100690 A1 | 5/2007 | Hopkins |
| 2007/0112630 A1 | 5/2007 | Lau et al. |
| 2007/0113240 A1 | 5/2007 | McLean et al. |
| 2007/0130602 A1 | 6/2007 | Gulli et al. |
| 2007/0157228 A1 | 7/2007 | Bayer et al. |
| 2007/0159522 A1 | 7/2007 | Neven |
| 2007/0204310 A1 | 8/2007 | Hua et al. |
| 2007/0245242 A1 | 10/2007 | Yagnik |
| 2007/0277205 A1 | 11/2007 | Grannan |
| 2007/0282893 A1 | 12/2007 | Smith et al. |
| 2007/0288518 A1 | 12/2007 | Crigler et al. |
| 2007/0288950 A1 | 12/2007 | Downey et al. |
| 2008/0004948 A1 | 1/2008 | Flake et al. |
| 2008/0005166 A1 | 1/2008 | Cragun et al. |
| 2008/0021775 A1 | 1/2008 | Lerman et al. |
| 2008/0027798 A1 | 1/2008 | Ramamurthi et al. |
| 2008/0033806 A1 | 2/2008 | Howe et al. |
| 2008/0066107 A1 | 3/2008 | Moonka |
| 2008/0092182 A1 | 4/2008 | Conant |
| 2008/0098420 A1 | 4/2008 | Khivesara et al. |
| 2008/0120324 A1 | 5/2008 | Davis |
| 2008/0139112 A1 | 6/2008 | Sampath et al. |
| 2008/0140502 A1 | 6/2008 | Birnholz et al. |
| 2008/0147497 A1 * | 6/2008 | Tischer .................. G06Q 30/02 |
| | | 705/14.61 |
| 2008/0155585 A1 | 6/2008 | Craner et al. |
| 2008/0163071 A1 | 7/2008 | Abbott et al. |
| 2008/0189169 A1 | 8/2008 | Turpin et al. |
| 2008/0201361 A1 | 8/2008 | Castro et al. |
| 2008/0229353 A1 | 9/2008 | Morris et al. |
| 2008/0249855 A1 | 10/2008 | Collins et al. |
| 2008/0263583 A1 | 10/2008 | Heath |
| 2008/0263673 A1 | 10/2008 | Brun et al. |
| 2008/0270883 A1 | 10/2008 | Friedman et al. |
| 2008/0276266 A1 | 11/2008 | Huchital et al. |
| 2008/0300974 A1 | 12/2008 | Bhandari et al. |
| 2008/0306999 A1 | 12/2008 | Finger et al. |
| 2008/0320512 A1 | 12/2008 | Knight |
| 2009/0049469 A1 | 2/2009 | Small et al. |
| 2009/0055375 A1 | 2/2009 | Oestlien et al. |
| 2009/0070836 A1 | 3/2009 | Aaby et al. |

(56) References Cited

U.S. PATENT DOCUMENTS

| | | | |
|---|---|---|---|
| 2009/0164419 A1 | 6/2009 | Taylor et al. | |
| 2009/0165041 A1 | 6/2009 | Penberthy et al. | |
| 2009/0287574 A1 | 11/2009 | Kane | |
| 2010/0037149 A1 | 2/2010 | Heath | |
| 2010/0125871 A1 | 5/2010 | Liao et al. | |
| 2010/0174607 A1 | 7/2010 | Henkin et al. | |
| 2010/0186028 A1 | 7/2010 | Moore et al. | |
| 2010/0278453 A1 | 11/2010 | King | |
| 2011/0131595 A1 | 6/2011 | Xue et al. | |
| 2013/0124282 A1* | 5/2013 | Hopwood | G06Q 30/0245 705/14.16 |
| 2013/0226690 A1 | 8/2013 | Gross | |
| 2013/0254802 A1 | 9/2013 | Lax et al. | |
| 2014/0289045 A1* | 9/2014 | Kramer | G06F 17/30864 705/14.54 |

FOREIGN PATENT DOCUMENTS

| | | |
|---|---|---|
| JP | 2003-242372 | 8/2003 |
| JP | 2006-155384 | 6/2006 |
| KR | 10-2002-0015858 | 3/2002 |
| KR | 10-2004-0069324 | 8/2004 |
| KR | 10-2006-0099253 | 9/2006 |
| WO | 97/21183 | 6/1997 |
| WO | 9936918 | 7/1999 |
| WO | 99/66719 | 12/1999 |
| WO | 01/50296 | 7/2001 |
| WO | 03/084219 | 10/2003 |
| WO | 2006/111912 | 10/2006 |
| WO | 2008/072874 | 6/2008 |

OTHER PUBLICATIONS

EP Communication from European Application No. 08781112.1 mailed Oct. 26, 2010, 4 pages.
European Search Report issued in international application No. 08756776.4 on Apr. 20, 2011, 3 pages.
Communication Pursuant to Article 94(3) EPC issued in international application No. 08756776.4 on Apr. 29, 2011, 7 pages.
PCT International Search Report and Written Opinion, PCT/US2008/062442, Jul. 14, 2008.
PCT International Search Report and Written Opinion, PCT/US2008/062103, Aug. 26, 2008.
International Search Report and Written Opinion for PCT Application No. PCT/US2008/068624, dated Aug. 4, 2009, 12 pages.
International Preliminary Report on Patentability issued in international application No. PCT/US2008/062103 on Nov. 3, 2009, 6 pages.
International Preliminary Report on Patentability issued in international application No. PCT/US2008/062442 on Nov. 3, 2009, 7 pages.
International Preliminary Report on Patentability issued in international application No. PCT/US2008/066175 on Dec. 11, 2009, 7 pages.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, Adknowledge, Aug. 1998.
AdKnowledge Market Match Planner: Reviewer's Guide, AdKnowledge, May 1998.
Ad-Star.com website archive from www.Archive.org. Apr. 12, 1997 and Feb. 1, 1997.
Baluja et al. "Video Suggestion and Discovery for YouTube: Taking Random Walks through the View Graph", ACM, WW 2008, Apr. 21-25, 2008.
Baseview Products, Inc., AdManagerPro Administration Manual v. 2.0, Dec. 1998.
Baseview Products, Inc., ClassManagerPro Administration Manual v. 1.0.5, Feb. 1, 1997.

Business Wire, "Global Network, Inc. Enters Into Agreement in Principle With Major Advertising Agency", Oct. 4, 1999.
Dedrick, R., A Consumption Model for Targeted Electronic Advertising, Intel Architecture Labs, IEEE, 1995.
Dedrick, R., Interactive Electronic Advertising, IEEE, Jun. 6, 1994.
Greg Sandoval: "YouTube: Too rough for advertisers?" [online] [Retrieved on Apr. 21, 2006]. Retrieved from the Internet: < URL: http://www.news.com >, 2 pages.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
Lowe, D.G., "Object Recognition from Local Scale-Invariant Features," Proc. Seventh IEEE Int'l Conf. on Computer Vision ICCV 99, Kerkyra, Greece, Sep. 20-27, 1999, pp. 1150-1157.
Raoul Emme, International Search Report and the Written Opinion in PCT/US2007/078299, mailed Feb. 5, 2008, 29 pages.
So Young Doo, International Search Report and the Written Opinion in PCT/US2008/060859, mailed Sep. 26, 2008, 10 pages.
Dorothée Mülhausen, International Preliminary Report on Patentability in PCT/US2007/078299, mailed Mar. 26, 2009, 14 pages.
International Preliminary Report on Patentability for PCT Application No. PCT/US2008/066175, mailed Dec. 23, 2009, 7 pgs.
International Search Report and Written Opinion from International Application No. PCT/US08/66175, mailed Jun. 9, 2009, 8 pgs.
International Preliminary Report on Patentability from International Application No. PCT/US2008/073914, mailed Mar. 4, 2010, 7 pgs.
International Search Report and Written Opinion from International Application No. PCT/US2008/073914 mailed Jun. 23, 2009, 14 pgs.
Masashi Honda, International Preliminary Report on Patentability in PCT/US2008/060859, mailed Oct. 29, 2009, 6 pages.
Mahesh Dwivedi, International Preliminary Report on Patentability for PCT Application No. PCT/US2008/068624, dated Jan. 5, 2010, 6 pages.
Jung Jin Kim, International Search Report and the Written Opinion in PCT/US2009/052866, mailed Mar. 18, 2010, 11 pages.
Authorized officer Simin Baharlou, International Preliminary Report on Patentability in PCT/US2009/052866, mailed Feb. 17, 2011, 7 pages.
Supplementary EP Search Report in EP 09 80 5508, mailed Nov. 3, 2011, 5 pages.
Chinese Office Action in Chinese Application No. 200980130845.X, dated Dec. 27, 2011, 17 pages.
Supplementary EP Search Report in EP 08 74 6298, mailed Jan. 23, 2012, 7 pages.
JP Office Action in Application No. 2009-528455, dated Aug. 13, 2012, 7 pages.
PC World, Steve Bass's Tips & Tweaks., http//blogs.pcworld.com/tipsandtweaks/archives/006418/html, downloaded Feb. 14, 2011, 2 pages.
Request for Reexamination of U.S. Pat. No. 6,829,587 B2, Control No. 95/001,068, Jul. 7, 2008.
Request for Reexamination of U.S. Pat. No. 6,446,045 B1, Control No. 95/001,061, Jul. 14, 2008.
Request for Reexamination of U.S. Pat. No. 7,240,025 B2, Control No. 95/001,073, Jul. 30, 2008.
Request for Reexamination of U.S. Pat. No. 7,249,059 B2, Control No. 95/001,069, Jul. 21, 2008.
Zeff, R., et al., Advertising on the Internet, 2nd Ed., John Wiley & Sons, 1999.
"Ad Serving with RealSystem™ G2," RealNetworks, 1999, 38 pages, [online] [Retrieved on Feb. 13, 2009] Retrieved from the internet <URL:http://service.real.com/help/library/blueprints/adserve/adserve.htm>.
"www.Scanscout.com," 2 pages, Archived on Apr. 7, 2007 on web.archive.org [online][Tretived on Oct. 19, 2009] Retrived from the internet: <URL:http://web.archive.org/web/20070407233129/http://www.scanscout.com/>.
"www.BrightRoll.com," 2 pages, Archived on Apr. 29, 2007 on web.archive.org [online] [Retrieved on Oct. 19, 2009] Retrieved from the internet: <URL:http://web.archive.org/web/20070429110654/http://www.birghtroll.com/>.

(56) References Cited

OTHER PUBLICATIONS

Ajax Activity Indicators, Archived on Dec. 25, 2006 on www.web.archive.org [online] [Retrieved on Jun. 10, 2008] Retrieved from the internet <URL:http://web.archive.org/web/20061225134638/http://www/napyfab.com/ajax-indicators/>.
Strange, Adario, "VideoEgg Exec: YouTube's New Ads are Just Like Ours," [online], [Retrieved Jun. 2008, pp. 1-8,] Retrieved from the internet <URL://http://blog.wired.com/business/2007/08/network-wars-vi.html>.
"Overlay & Video AdType," ScanScout, 2007, [online] [Retrieved on Jul. 15, 2008] Retrieved from the internet <URL://demo.scanscount.com/livedemo.shtml?adType=overlay&videoAdType=rightSide&ss . . . >.
Riley, D., "Contextual In-Video Advertising: ScanScout," May 14, 2007, [online] [Retrieved on Jul. 15, 2008] Retrieved from the internet <URL://www.techcrunch.com/2007/05/14/contextual-in-video-advertising-scanscout/.>.
Delaney, Kevin J., "Start-Ups See to Cash in on Web-Video Ads", Wall Street Journal, Mar. 2, 2007,[online] [Retrieved Sep. 3, 2008] Retrieved from the internet <URL://www.scanscout.com/wsj-070302.html]>.
"www.YuMe.com," 2009, 1 Page, [online] [Retrieved on Oct. 19, 2009] Retrieved from the internet: <URL:http://www.yume.com/>.
Communication pursuant to Article 94(3) EPC for EP Appl. No. EP 07 842 355.5-1502 dated Mar. 14, 2013, 6 pages.
Japanese Second Office Action for JP 2009-528455 dated Jun. 18, 2013 w/English translation, 4 pages.
Office Action issued in U.S. Appl. No. 12/029,140 on Mar. 11, 2015, 25 pages.
Office Action issued in U.S. Appl. No. 12/029,140 on Sep. 8, 2014, 23 pages.
Office Action issued in U.S. Appl. No. 12/029,140 on Jul. 8, 2011, 18 pages.
Office Action issued in U.S. Appl. No. 12/029,140 on Dec. 9, 2010, 13 pages.
Notice of Allowance issued in U.S. Appl. No. 12/637,635 on May 22, 2015, 27 pages.
Office Action issued in U.S. Appl. No. 12/637,635 on Jan. 28, 2015, 23 pages.
Office Action issued in U.S. Appl. No. 12/637,635 on May 6, 2014, 23 pages.
Office Action issued in U.S. Appl. No. 12/637,635 on Oct. 2, 2013, 20 pages.
Office Action issued in U.S. Appl. No. 12/637,635 on Jul. 24, 2012, 18 pages.
Office Action issued in U.S. Appl. No. 12/637,635 on Nov. 23, 2011, 30 pages.

\* cited by examiner

BUNDLE GENERATION

CROSS-REFERENCE TO RELATED APPLICATION

This application is a continuation of U.S. application Ser. No. 11/842,732, filed Aug. 21, 2007, the contents of which are incorporated by reference.

FIELD OF THE INVENTION

The systems and methods described herein generally relate to advertising systems.

BACKGROUND

Content for a web page or other entity can include media files that are related to the content of the web page. The content can be included in a content page, such as the web page, that is delivered to a user through a browser. This content is typically manually selected by a publisher of a web page and embedded into the web page. The content that the publishers typically embed can have associated advertising. However, if advertisements are included, the advertisements targeted or sold may not relate to the content on the publisher's site, as manually selecting media to display on a publisher's web page does not ensure that the publisher's web page displays the media that is best targeted to the publisher's audience.

SUMMARY

Disclosed herein are systems and methods for generating optimal content to be displayed to a user requesting the content through, for example, a browser. In one implementation, a content page, e.g., a web page, can be analyzed to determine first topics related to the subject matter of the content page. Second topics can be identified from first content elements, e.g. advertisements, and second content elements, e.g. media files. The first topics and second topics can be analyzed to determine common topics. Content from the first and second content elements can be identified based on the common topics. A bundle can be generated from the identified content and transmitted to a publisher. The publisher can embed the bundle within the content page.

In another implementation, the bundle can be monitored to evaluate the performance according to one or more parameters. If the bundle does not meet parameter thresholds, the bundle elements that do not meet the parameter thresholds can be removed and replaced with additional content from the first and second content elements.

In another implementation, a bundle analysis engine can be configured to identify first topics related to a content page and identify second topics related to first content elements and second content elements. The bundle analysis engine can also identify common topics among the first topics and the second topics. A bundler can be configured to generate a bundle from the first content elements and the second content elements based on the common topics identified by the bundle analysis engine. A monitoring engine can be configured to monitor a performance of the bundle of first content elements and second content elements.

In one implementation, first topics related to one or more advertisements can be identified. Second topics can be identified related to a content page and one or more media files, wherein the media files are selected by a publisher of the content page. Common topics common to the first topics and second topics can be identified. One or more advertisements can be selected to combine in a bundle with the one or more selected media files based on the common topics. A bundle can be generated from the one or more advertisements and selected media files and transmitted to a publisher. The publisher can embed the bundle within the content page.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
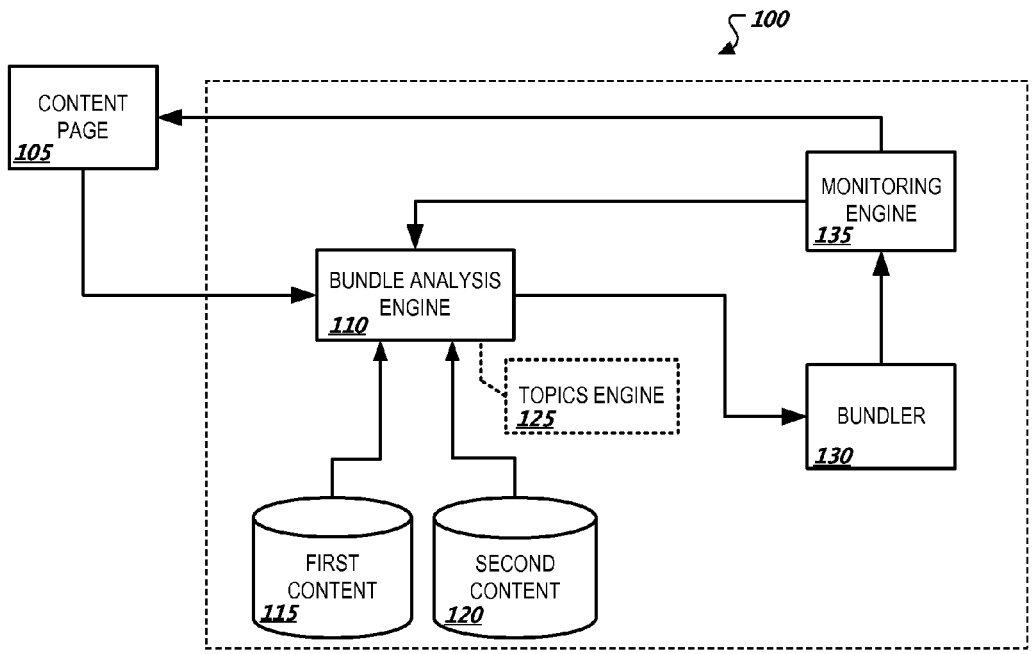
FIGS. 1A and 1B are block diagrams of an example bundle generator system.
Figure 1B:
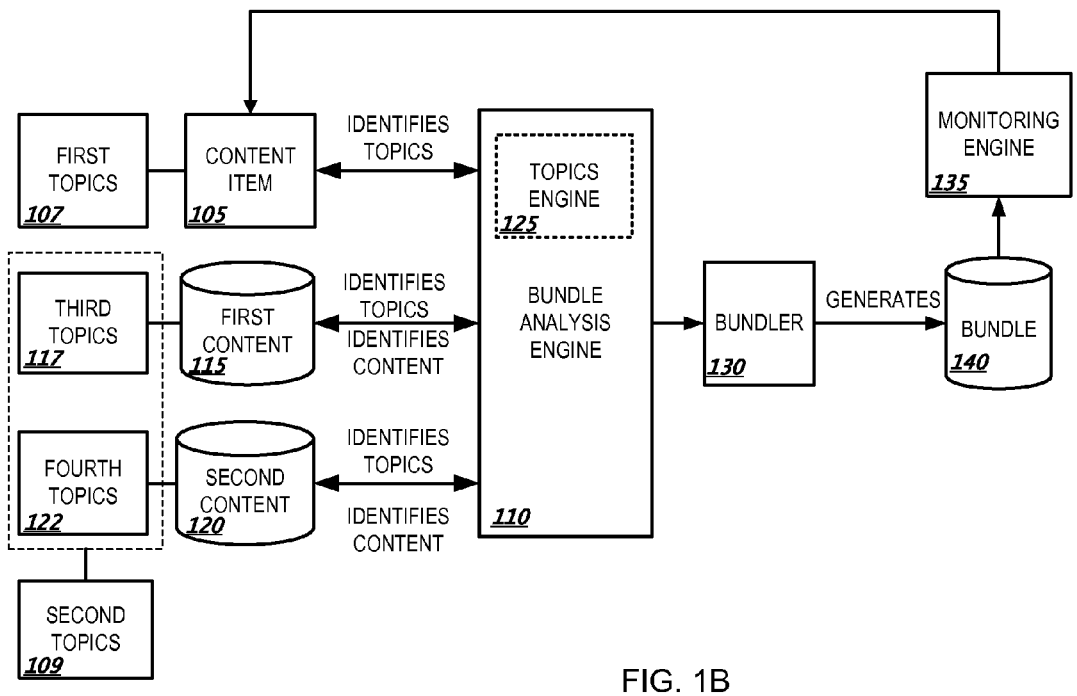

FIGS. 1A and 1B are block diagrams of an example bundle generator system 100. A bundle analysis engine 110 can identify first topics 107 related to a content page 105, e.g. using a topics engine 125. The content page 105 can be a web page that publishes a variety of different content, e.g. video, audio, text, advertisements, news feeds, digital print, images, etc.

In one implementation, the first topics 107 of the content page 105 can be identified by analyzing signals from a content source associated with the content page 105. For example, the signals can be keywords that are related to the content page 105 and that are identified by the topics engine 125 of the bundle analysis engine 110. The topics engine 125 can crawl, i.e., scan, the content page 105 and determine keywords that are related to the content page 105. After identifying the keywords related to the content page 105, the topics engine 125 of the bundle analysis engine 110 can rank the identified keywords to generate the first topics 107. Other signals can be identified from a content source associated with the content page 105.

For example, the content page 105 can be a web page that is related to sports in general, but primarily relates to baseball, and which sells baseball equipment. After analyzing the web page, the topics engine 125 can identify the keywords of the content page 105 as sports, baseball, and baseball equipment. Subsequently, the topics engine 125 can rank the keywords to determine which keywords are the most relevant to the web page. For example, this list can include baseball equipment, baseball, and sports. The list can represent the first topics 107.

In another implementation, the first topics 107 of the content page 105 can be identified by receiving one or more of the first topics 107 from a content source associated with the content page 105. For example, a publisher of the content page 105 can supply topics to the bundle analysis engine 110 based on the publisher's analysis of what are the most relevant topics of the content page 105. In this implementation, the bundle analysis engine 110 can use the publisher's recommendations as the first topics 107.

The bundle analysis engine 110 can identify second topics 109 related to first content elements 115 and second content elements 120. The first content elements 115 can include advertisement content, and the advertisement content can come from one or more advertisement content sources. The second content elements 120 can include media content, e.g. video files, audio files, etc, and the media content can come from one or more media content sources. In one implementation, the first content elements 115 can also include advertisements in the form of media files, such as video files.

In one implementation, the second topics 109 related to the first content elements 115 and the second content elements 120 can be identified by analyzing signals from the first content elements 115 and the second content elements 120. For example, the signals can be keywords that are related to the first content elements 115 and the second content elements 120. These keywords can be identified by the topics engine 125 of the bundle analysis engine 110.

For example, the topics engine 125 can identify one or more keywords related to the first content elements 115, and can rank these keywords to produce a set of third topics 117. The first content elements 115 can, for example, include advertisements related to a variety of different topics.

The topics engine 125 can also identify one or more keywords related to the second content elements 120. The second content elements 120 can include media content, e.g. video files, audio files, etc., related to a variety of different topics, and the topics engine 125 can identify keywords from this media content, and can rank these keywords to produce a set of fourth topics 122.

Other signals can also be analyzed related to the first content elements 115 and the second content elements 120. For example, the first content elements 115 and the second content elements 120 can include media files, such as video files. In one implementation, the analyzed signals can include keywords associated with the media file. For example, the keywords can include the title, description, metadata, and comments associated with the media file. The keyword can also include web page anchor text that directs a user to the media file, and search query logs or click logs that keep track of how users are directed to a particular advertisement and which other advertisements they may interact with.

In another implementation, additional signals related to the media files can be analyzed. For example, speech-to-text technology can be utilized to determine particular keywords related to the media files by converting the audio signal to text signals. Media file metric data can also be analyzed and can include data regarding the presentation of the media file, such as the play and pause time; whether the media file had been fast-forward, rewound, and/or skipped; stop events, the duration of the media file that was viewed and/or listened to; the number of media files, including videos and/or advertisements watched in a bundle, and click-throughs. In another implementation, video content analysis data, such as face detection, object detection, and/or color histogram, can also be analyzed.

Additional signals can include data related to the users who interact with the media files. For example, these signals can include demographic information regarding the users. The signals can also include information about other media files that a particular user has interacted.

Based on the analyzed signals, the topics engine 125 can derive a set of second topics 109 based on the third topics 117 from the first content elements 115 and the fourth topics 122 from the second content elements 120.

In another implementation, the second topics 109 related to the first content elements 115 and the second content elements 120 can be identified based on the first topics 107 related to the content page 105. For example, the topics engine 125 can identify one or more keywords related to the first content elements 115 based on the first topics 107 from the content page 105. The topics engine 125 can also rank these keywords to produce a set of third topics 117. The topics engine 125 can also identify one or more keywords related to the second content elements 120 based on the first topics 107 from the content page 105, and can also rank these keywords to produce a set of fourth topics 122.

The topics engine 125 of the bundle analysis engine 110 can identify common topics that are common to the first topics 107 and the second topics 109. In one implementation, the topics engine 125 can identify the common topics by combining the rankings from the first topics 107 and the second topics 109 to determine the most common topics.

For example, the first topics 107 from the content page 105, such as a web page, can include baseball equipment, baseball, and sports. Additionally, the second topics 109 from the first content elements 115 and the second content elements 120 can include football, basketball, soccer, baseball, sporting equipment, and baseball instructional videos. From these two sets of topics, the topics engine 125 can determine that the common topics common to the first topics 107 and the second topics 109 are baseball, sporting equipment, and baseball instructional videos. For example, the topics engine 125 can identify that the topic of "baseball" is common among the topics of baseball, sporting equipment, e.g., baseball equipment can be a subset of the topic of sporting equipment, and baseball instructional videos.

After identifying the common topics, the bundle analysis engine 110 can generate a bundle from the first content elements 115 and second content elements 120 based on the common topics. The common topics can be ranked to determine which topics are the most relevant between the content page 105, first content elements 115, and the second content elements 120. To generate a bundle, the bundle analysis engine 110 can identify first content elements 115 and second content elements 120 based on the common topics.

For example, the common topics can be baseball, sporting equipment, and instructional videos. The topics engine 125 can rank these common topics and determine that the ranked order of the most common topics can be sporting equipment, baseball, and instructional videos. The bundle analysis engine 110 can use the ranked order of most common topics to identify first content elements 115 and second content elements 120 to utilize in the bundle 140.

In one implementation, the bundle analysis engine can identify first content elements 115 and second content elements 120 based on the common topics. Therefore, the bundle analysis engine 110 can search the first content elements 115 and the second content elements 120 and select content from the first content elements 115 and the second content elements 120 to utilize in the bundle. For example, in the first content elements 115, the bundle analysis engine 110 can identify advertisements related to a sporting goods store, baseball paraphernalia, ticket agencies selling tickets to baseball games, etc. Furthermore, in the second content elements 120, the bundle analysis engine 110 can identify media content such as baseball highlights, instructional videos teaching baseball skills, podcasts providing baseball commentary, etc. The bundle analysis engine 110 can send the identified content to the bundler 130 to generate a bundle 140.

In another implementation, the bundle analysis engine 110 can identify first content elements 115 and second content elements 120 by evaluating the identified first content elements 115 and second content elements 120 according to one or more performance parameters. Evaluating the identified first content elements 115 and second content elements 120 according to one or more performance parameters can allow the bundle analysis engine 110 to generate a bundle 140 that is optimized for a higher performance with regards to, for example, monetization and relevance.

The bundle analysis engine 110 can search the first content elements 115 and the second content elements 120 and select elements from both the first content elements 115 and the second content elements 120 based on the common topics. In the example above, the bundle analysis engine 110 can identify advertisements related to a sporting goods store, baseball paraphernalia, and ticket agencies selling tickets to baseball games from the first content elements 115 and the bundle analysis engine 110 can identify media content such as baseball highlights, instructional videos teaching baseball skills, and podcasts providing baseball commentary from the second content elements 120. The bundle analysis engine 110 can evaluate each identified content element from both the first content elements 115 and the second content elements 120 according to one or more performance parameters.

For example, the identified content elements can be monitored with respect to a click-through rate; a click-to-play rate; an aggregate cost; and/or a consumption. In another implementation, the identified content elements can be evaluated by monitoring the past performance of the elements according to the one or more performance parameters. In another implementation, the identified content elements can be evaluated by monitoring the performance of the elements relative to other content pages 105, e.g. web pages, in a similar genre or category. Other performance parameters can be used to monitor the performance of the first content elements 115 and the second content elements 120.

Based on the measured values of the one or more performance parameters, the bundle analysis engine 110 can select first content elements 115 and the second content elements 120 that can be combined in a bundle 140 that is optimized for a higher performance with regards to, for example, monetization and relevance. For example, the bundle analysis engine 110 can determine the total number of first content elements 115 and the second content elements 120 to include in the bundle 140. Furthermore, the bundle analysis engine 110 can determine the optimal number of first content elements 115 to show in combination with the second content elements 120, and in what sequence these elements will be shown.

The bundler 130 can combine the first content elements 115 and the second content elements 120 that were identified by the bundle analysis engine 110 into a bundle 140. The bundle 140 can be transmitted to a user requesting the content page 105. For example, the bundle analysis engine 110 can determine that the best combination of first content elements 115 and second content elements 120 would be a bundle 140 that includes advertisements for a sporting goods store that sells baseball equipment along with instructional videos teaching how to hit a baseball.

Additional first content elements 115 and second content elements 120 could also be included in the bundle 140 that is created by the bundler 130. After the bundler 130 has created the bundle 140, the bundle 140 can be transmitted to a publisher of the content page, such as a web page. The publisher can embed the bundle within the web page, and the bundle can be displayed to a user who has requested the web page.

In another implementation, the performance of a first bundle of first content elements 115, e.g., advertisements, and second content elements 120, e.g. media files, can be monitored by a monitoring engine 135 at a content page 105. The performance of the first bundle can be monitored with a monitoring engine 135 by evaluating the first bundle of advertisements and media files according to one or more performance parameters. If the monitored performance of the first bundle is less than a threshold, the bundle analysis engine 110 can generate a second bundle of advertisements and media files. Other performance parameters can be used to monitor the performance of a first bundle of first content elements 115 and the second content elements 120 by the monitoring engine 135.

For example, the performance of a first bundle can be monitored with respect to an aggregate click-through rate, a click-to-play rate, an aggregate cost, and a consumption. The monitoring engine 135 can determine whether the values of the one or more measured performance parameters meet a threshold. In response to determining that the values of the one or more measured performance parameters do not meet the threshold, the bundle analysis engine 110 can generate a second bundle of advertisements and media files.

In one implementation, after determining that the values of the one or more measured performance parameters do not meet the threshold, the bundle analysis engine 110 can generate a second bundle by repeating the process used to create the first bundle. For example, the bundle analysis engine 110 could identify a set of first topics 107 related to the content page 105 and can also identify a set of second topics 109 related to the first content elements 115 and second content elements 120 based on the first topics 107. The bundle analysis engine can also identify a set of common topics that were common to the first topics 107 and the second topics 109, and generate a second bundle from first content elements 115 and second content elements 120 based on the common topics. In some implementations, bundle elements can be substituted over time. The performance of the new bundle configuration can be measured and compared to previous bundle configurations. An optimal configuration can be derived over time.

In another implementation, the bundle analysis engine 110 can adjust the first bundle of advertisements and media files in response to the monitoring engine 135 determining that the values of the one or more measured performance parameters do not meet a threshold. For example, bundle analysis engine 110 can remove the advertisements and/or media files from the first bundle that do not meet the threshold values. The bundle analysis engine 110 can identify additional advertisements from the first content elements 115 and/or media files from the second content elements 120 that would be relevant to replace the removed elements. The bundle analysis engine 110 could transmit these additional elements to the bundler 130 that could combine the additional advertisements and/or media files into a second bundle with the remaining advertisements and/or media files from the first bundle.

For example, the performance of the bundle can be monitored with respect to an aggregate click-through rate. The aggregate click-through rate can represent the number of times the first bundle was selected by a user viewing the first bundle in a ratio to the number of times it was displayed. Therefore, if the aggregate click-through rate of the first bundle is low, the monitoring engine 135 can analyze the advertisements and/or media files from the first bundle to determine which elements are performing below a threshold with respect to the click-through rate. Based on the analysis, the bundle analysis engine 110 can decide to replace any and/or all of the advertisements and/or media files from the first bundle with additional advertisements and/or media files into a second bundle with the goal of improving the aggregate click-through rate of the bundle.

Figure 1C:
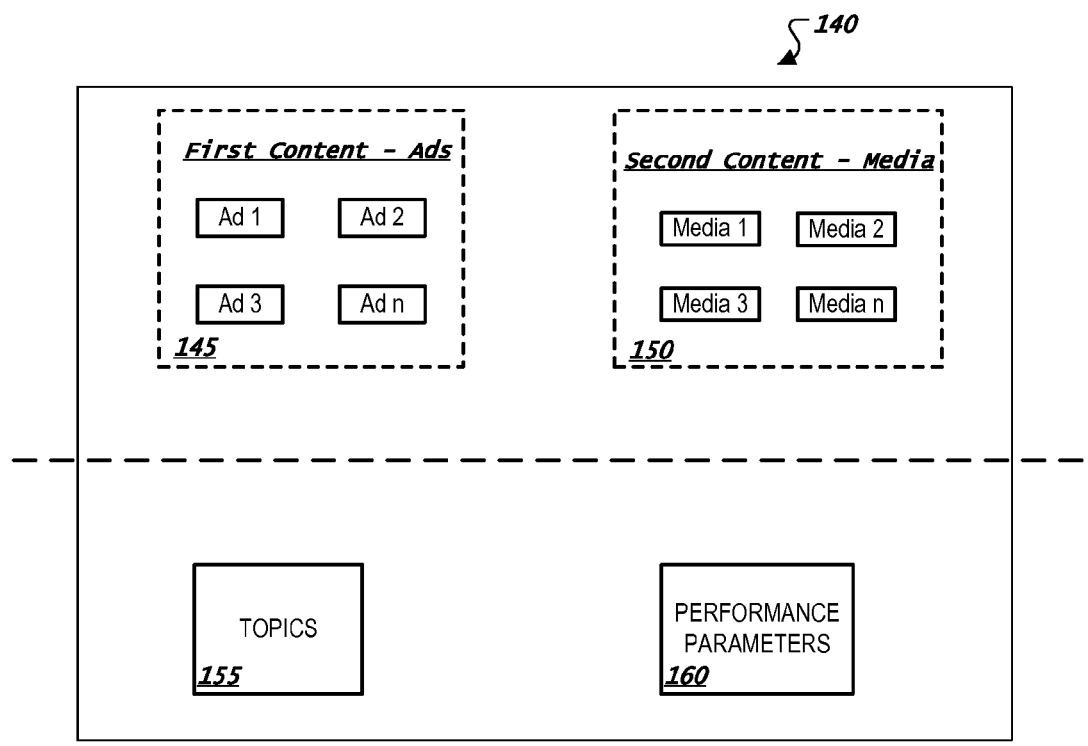
FIG. 1C is a block diagram of an example bundle of first content elements and second content elements.

FIG. 1C is a block diagram of an example bundle of first content elements and second content elements. The bundle 140 can include first content elements 145, e.g. ads, that are identified by the bundle analysis engine 110 from the first content elements 115. The bundle 140 can also include second content elements 150, e.g. media, that are identified by the bundle analysis engine 110 from the second content elements 120. The bundle 140 can also include topics 155 which can include common topics common to the content page 105, first content elements 115, and the second content elements 120. The topics 155 in the bundle 140 can be identified by the topics engine 125. The bundle 140 can also include performance parameter data 160 which can include performance parameter data associated with the identified first content elements 145 and second content elements 150 of the bundle 140.

In one implementation, the bundle 140 can be stored at a web page associated with the content page 105. For example, the bundle 140 can be transmitted by the bundle generator system 100 to a publisher of the content page 105, such as a web page. The publisher can embed the bundle 140 within the web page, and the bundle 140 can be displayed to a user who has requested the web page.

In another implementation, the bundle 140 can be stored at the bundle generator system 100. For example, the bundle 140 can be generated and stored by the bundle generator system 100. Selected content of the bundle 140 can then be transmitted to a user requesting the content page 105.

In another implementation, portions of the bundle 140 can be stored at the content page 105 and other portions of the bundle 140 can be stored at the bundle generator system 100. For example, the first content elements 145 and the second content elements 150 can be transmitted to a publisher of the content page 105, such as a web page, and the publisher can embed the first content elements 145 and the second content elements 150 of the bundle 140 within the web page. Furthermore, the topics 155 and the performance parameter data 160 can be stored at the bundle generator system 100. For example, the bundle generator system 100 can store the topics 155 and the performance parameter data 160 to facilitate the monitoring of the first content elements 145 and the second content elements 150 of the bundle 140.

The bundle 140 can, for example, be displayed to a user in a media player. In one implementation, the media player can display one of the identified second content elements 150, i.e., video files, of the bundle 140 in a main window of the video player. Furthermore, thumbnails of other video files and/or identified first content elements 145, i.e., advertisements, can, for example, be displayed on a side and/or bottom panel of the media player. The thumbnails can, for example, allow a user to select a different content element to be displayed in the media player. In another implementation, a media player can display a sequence of content elements, i.e., a play list, that includes one or more identified first content elements 145 and second content elements 150.

Figure 1D:
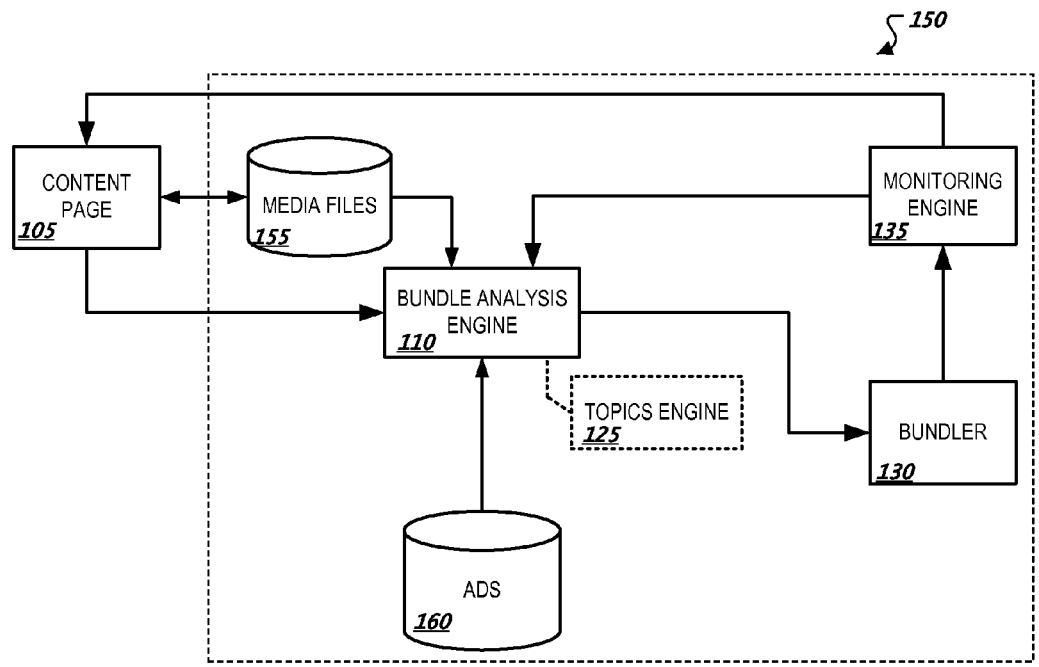
FIGS. 1D and 1E are block diagrams of another example bundle generator system.
Figure 1E:
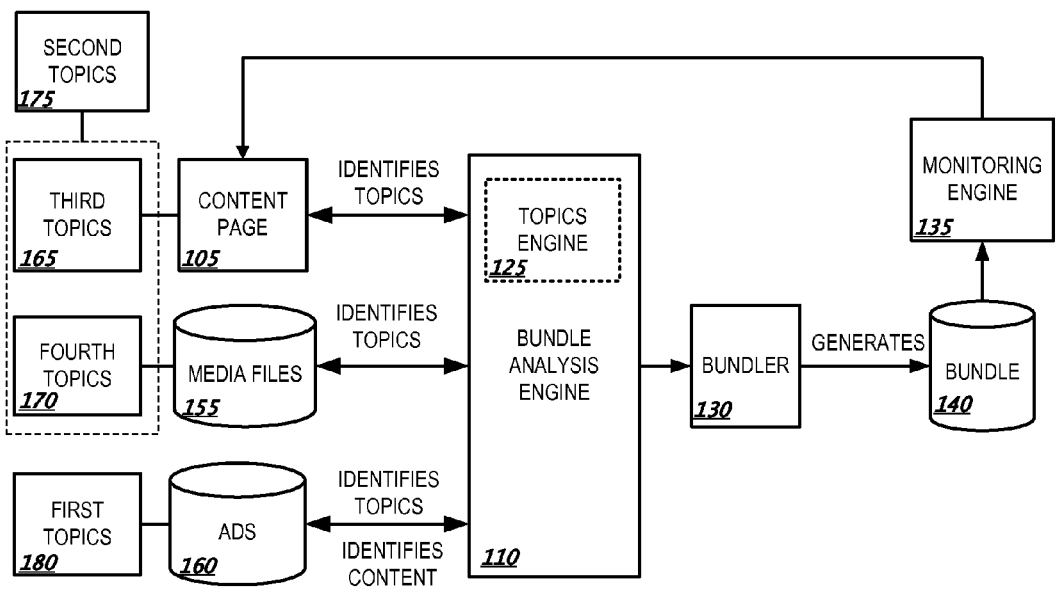

FIGS. 1D and 1E are block diagrams of another example bundle generator system 150. In the example bundle generator system 150, a publisher of a content page 105 can select one or more media files 155 to display on the content page 105. In response, the example bundle generator system 150 can identify relevant advertisements 160 to display in conjunction with the one or more selected media files 155 in a bundle 140.

A bundle analysis engine 110 can identify first topics 180 related to one or more advertisements 160. In one implementation, the first topics 180 related to the one or more advertisements 160 can be identified by analyzing signals from the one or more advertisements 160. For example, the signals discussed with respect to the first content elements 115 as identified with respect to FIGS. 1A and 1B can be utilized with respect to FIGS. 1D and 1E for the one or more advertisements 160. For example, the signals can be keywords that are related to the advertisements 160. These keywords can be identified by the topics engine 125 of the bundle analysis engine 110. For example, the topics engine 125 can identify one or more keywords related to the one or more advertisements 160, and can rank these keywords to produce the set of fourth topics 180.

The bundle analysis engine 110 can also identify third topics 165 related to a content page 105, e.g. using a topics engine 125. The content page 105 can be a web page that publishes a variety of different content, e.g. video, audio, text, advertisements, news feeds, digital print, images, etc. In one implementation, the third topics 165 of the content page 105 can be identified by analyzing signals from a content source associated with the content page 105. For example, the signals discussed with respect to the content page 105 as identified with respect to FIGS. 1A and 1B can be utilized with respect to FIGS. 1D and 1E for the content page 105.

The bundle analysis engine 110 can also identify fourth topics 170 related to selected media files 155. For example, the publisher of the content page 105 can select one or more media files 155 to be displayed on the content page 105. In one implementation, the publisher can select a list of particular media files 155 to be displayed. In another implementation, the publisher can, for example, select media files 155 that are associated with a particular provider, genre, keyword, etc.

In one implementation, the fourth topics 170 related to the selected media files 155 can be identified by analyzing signals from the selected media files 155. For example, the signals discussed with respect to the second content elements 120 as identified with respect to FIGS. 1A and 1B can also be utilized with respect to FIGS. 1D and 1E for the selected media files 155.

Based on the analyzed signals, the topics engine 125 can derive a set of second topics 175 based on the third topics 165 from the content page 105 and the fourth topics 170 from the selected media files 155. For example, the topics engine 125 can rank keywords associated with the content page 105 to produce the set of third topics 165, and can rank keywords associated with the selected media files 155 to produce the set of fourth topics 170. The set of second topics 175 can then, for example, be derived based on the combined rankings.

The topics engine 125 of the bundle analysis engine 110 can then, for example, identify common topics that are common to the first topics 180 and the second topics 175. In one implementation, the topics engine 125 can identify the common topics by combining the rankings from the first topics 180 and the second topics 175 to determine the most common topics.

In one implementation, the bundle analysis engine 110 can identify advertisements 160 based on the common topics. Therefore, the bundle analysis engine 110 can select one or more advertisements 160 to combine in a bundle 140 with the one or more selected media files 155 based on the common topics. For example, after selecting one or more advertisements 160, the bundle analysis engine 110 can send the identified advertisements 160 along with the publisher selected media files 155 to the bundler 130 to generate a bundle 140.

In another implementation, the bundle analysis engine 110 can identify advertisements 160 by evaluating the advertisements 160 according to one or more performance parameters. Evaluating the advertisements 160 according to one or more performance parameters can allow the bundle analysis engine 110 to generate a bundle 140 that is optimized for a higher performance with regards to monetization and relevance.

Based on the evaluation of the advertisements 160 with respect to one or more performance parameters, the bundle analysis engine 110 can select advertisements 160 that can be combined in a bundle 140 with the selected media files 155 that is optimized for a higher performance with regards to monetization and relevance. The bundler 130 can combine the advertisements 160 with the selected media files 155 into a bundle 140. The bundle 140 can be transmitted to a user requesting the content page 105.

Additional media files 155 and advertisements 160 can also be included in the bundle 140 that is created by the bundler 130. After the bundler 130 has created the bundle 140, the bundle 140 can be transmitted to a publisher of the content page, such as a web page. The publisher can embed the bundle within the web page, and the bundle can be displayed to a user who has requested the web page.

Figure 2:
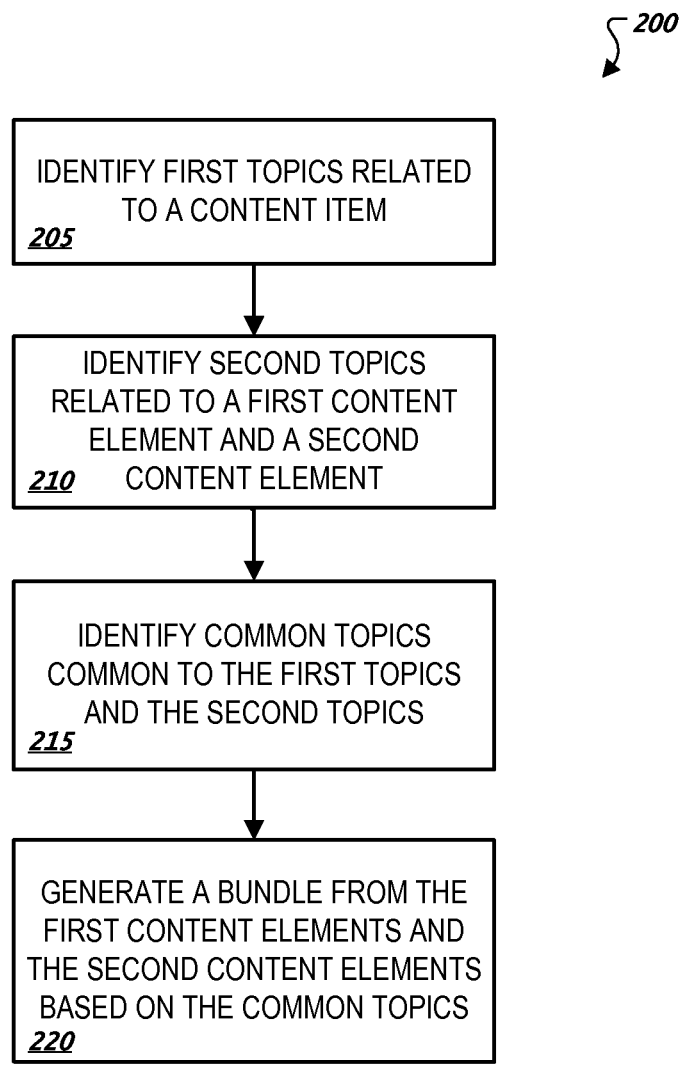
FIG. 2 is a flow diagram of an example process for generating a bundle of content from first content elements and second content elements.

FIG. 2 is a flow diagram of an example process 200 for generating a bundle of content from first content elements and second content elements. The process 200 can, for example, be implemented in the bundle analysis engine 110. In one implementation, the bundle analysis engine 110 can be integrated into the bundle generator system 100. In another implementation, the bundle analysis engine 110 can be integrated into the content page 105.

Stage 205 identifies first topics related to a content page. The content page 105 can be a web page that publishes a variety of different content, e.g. video, audio, text, advertisements, news feeds, digital print, images, etc. For example, the first topics 107 can be identified with a topics engine 125 that analyzes signals from the web page, wherein the signals can include relevant keywords related to the content on the web page. The identified relevant keywords can be ranked by the topics engine 125 to generate the first topics 107. The first topics 107 can also include one or more items transmitted from a content source associated with the content page 105.

Stage 210 identifies second topics related to the first content elements and second content elements. The first content elements can include advertisement content, and the second content elements can include media content, e.g. video files, audio files, etc. The second topics can be identified by analyzing keywords related to the first content elements and second content elements. These keywords can, for example, be identified by a topics engine 125.

Stage 215 identifies common topics that are common to the first topics and the second topics. For example, the common topics can be identified by the topics engine 125 by combining the rankings from the first topics 107 and the second topics 109.

Stage 220 generates a bundle from the first content elements and second content elements based on the common topics. For example, a bundler 130 can generate the bundle 140 after a bundle analysis engine 110 has identified first content elements 115 and second content elements 120.

Other processes for generating a bundle of content from first content elements and second content elements can also be used.

Figure 3:
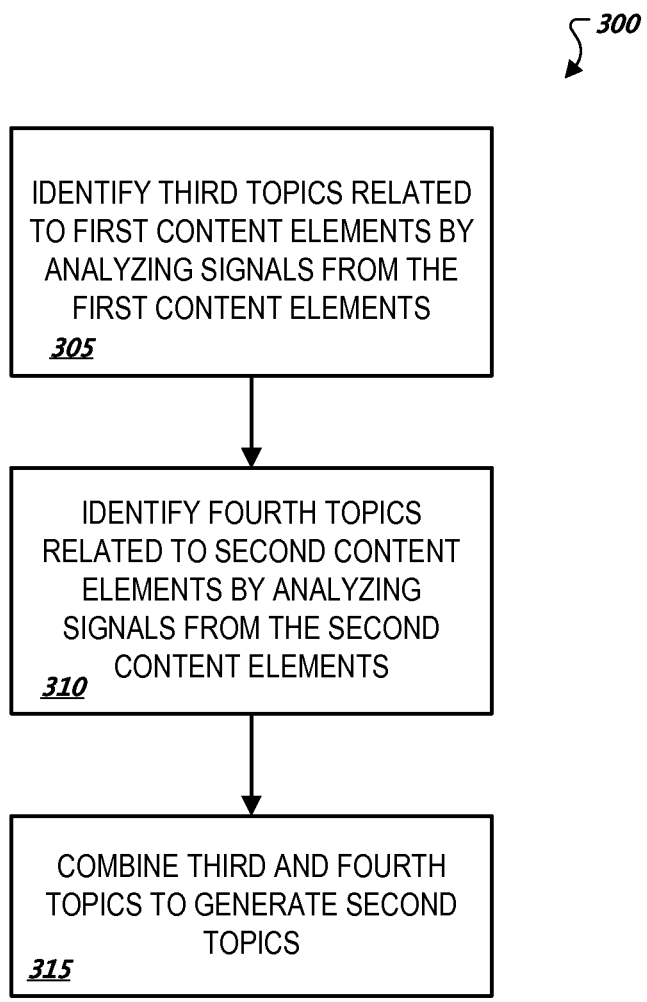
FIG. 3 is flow diagram of an example process for identifying a set of topics from first content elements and second content elements.

FIG. 3 is flow diagram of an example process 300 for identifying a set of topics from first content elements and second content elements. The process 300 can, for example, be implemented in the topics engine 125. In one implementation, the topics engine 125 can be integrated into the bundle analysis engine 110. In another implementation, the topics engine 125 can be integrated into the bundle generator system 100. In another implementation, the topics engine 125 can be integrated into the content page 105.

Stage 305 identifies third topics related to the first content elements by analyzing signals from the first content elements. The signals from the first content elements can include relevant keywords related to the content of the first content elements. A topics engine 125 can, for example, analyze the signals from the first content elements. The identified relevant keywords can be ranked by the topics engine 125 to generate the third topics 117.

Stage 310 identifies fourth topics related to the second content elements by analyzing signals from the second content elements. The signals from the second content elements can include relevant keywords related to the content of the second content elements. A topics engine 125 can, for example, analyze the signals from the second content elements. The identified relevant keywords can be ranked by the topics engine 125 to generate the fourth topics 122.

Stage 315 combines the third and fourth topics to generate the second topics. For example, the ranked lists of third and fourth topics 122 can be combined by a topics engine 125 to determine the most relevant topics to the first topics 107 from the content page 105.

Other processes for identifying a set of topics from first content elements and second content elements can also be used.

Figure 4:
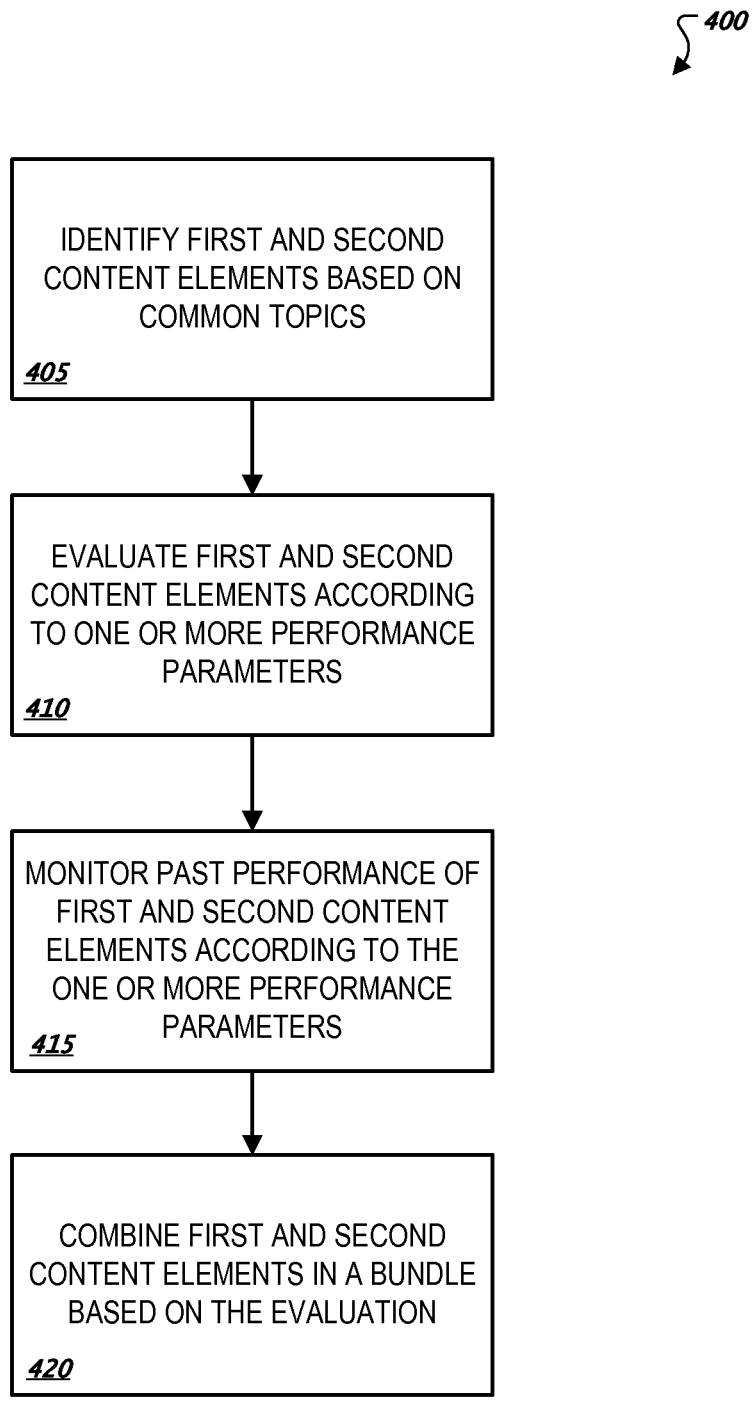
FIG. 4 is a flow diagram of another example process for generating a bundle of first content elements and second content elements.

FIG. 4 is a flow diagram of an example process 400 for generating a bundle of content. The process 400 can, for example, be implemented in the bundle analysis engine 110. In one implementation, the bundle analysis engine 110 can be integrated into the bundle generator system 100. In another implementation, the bundle analysis engine 110 can be integrated into the content page 105.

Stage 405 identifies first content elements and second content elements based on the common topics. For example, the bundle analysis engine 110 can search the first content elements 115 and second content elements 120 and select elements from the first content elements 115 and second content elements 120 to utilize in the bundle 140 that have similar topics as compared to the content page 105.

Stage 410 evaluates first content elements and second content elements according to one or more performance parameters. For example, after identifying the first content elements 115 and second content elements 120, the bundle analysis engine 110 can evaluate the performance of the elements according to performance parameters, such as a click-through rate, a click-to-play rate, an aggregate cost, and a consumption.

Stage 415 monitors the past performance of first content elements and second content elements according to one or more performance parameters. For example, the bundle analysis engine 110 can evaluate the past performance of the elements according to performance parameters, such as a click-through rate, a click-to-play rate, an aggregate cost, and a consumption.

Stage 420 combines first content elements and second content elements in a bundle based on the evaluation of the first content elements and second content elements according to one or more performance parameters. For example, the bundle analysis engine 110 can select first content elements 115 and second content elements 120 that can be combined in a bundle 140 that is optimized for a higher performance with regards to monetization and relevance. For example, the bundle analysis engine 110 can determine the total number of first content elements 115 and second content elements 120 to include in the bundle 140, and the bundle analysis engine 110 can determine the optimal number of first content elements 115, e.g. advertisements, to show in combination with the second content elements 120, e.g. media files, and in what sequence these elements will be shown.

Other processes for generating a bundle of content can also be used.

Figure 5:
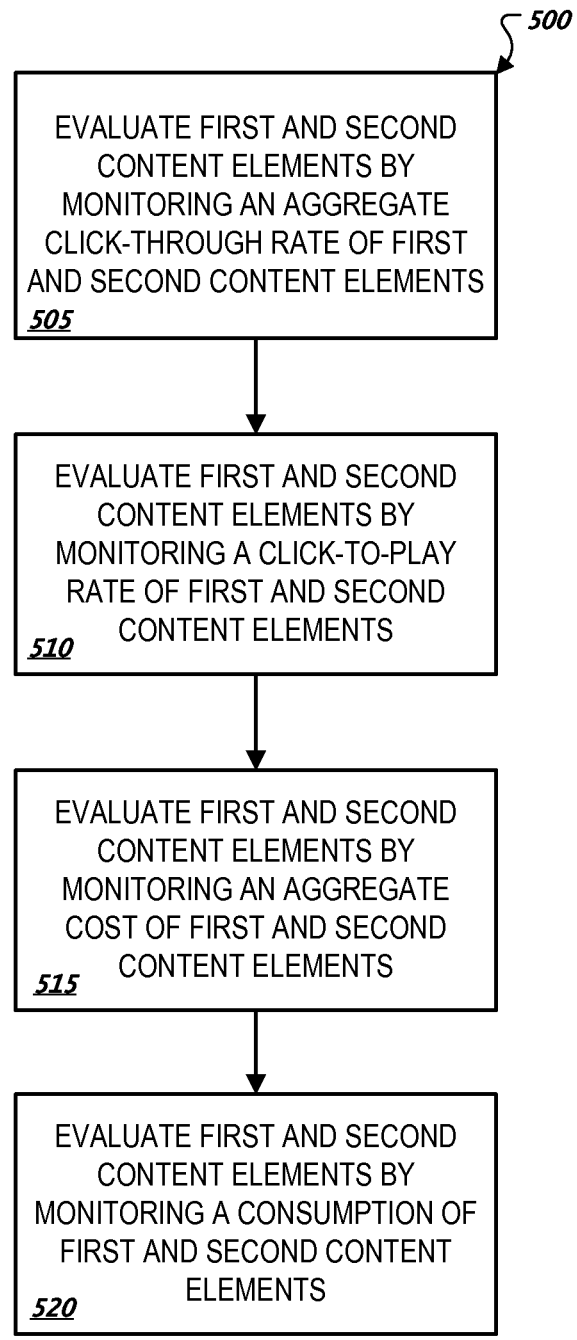
FIG. 5 is a flow diagram of an example process for evaluating first content elements and second content elements.

FIG. 5 is a flow diagram of an example process 500 for evaluating first content elements and second content elements. For example, the performance of the first bundle can be monitored with a monitoring engine 135 by evaluating the first bundle of first content elements 115, e.g. advertisements, and second content elements 120, e.g. media files, according to one or more performance parameters. The process 500 can, for example, be implemented in the monitoring engine 135. In one implementation, the monitoring engine 135 can be integrated into the bundle generator system 100. In another implementation, the monitoring engine 135 can be integrated into the content page 105.

Stage 505 evaluates first content elements and second content elements by monitoring an aggregate click-through rate of first content elements and second content elements. Stage 510 evaluates first content elements and second content elements by monitoring a click-to-play rate of first content elements and second content elements. Stage 515 evaluates first content elements and second content by monitoring an aggregate cost of first content elements and second content elements. Stage 520 evaluates first content elements and second content elements by monitoring a consumption of first content elements and second content elements. A monitoring engine 135 can, for example, be utilized for monitoring first content elements and second content elements with respect to an aggregate click-through rate, a click-to-play rate, an aggregate cost, and/or a consumption.

Other processes for evaluating first content elements and second content elements can also be used.

Figure 6:
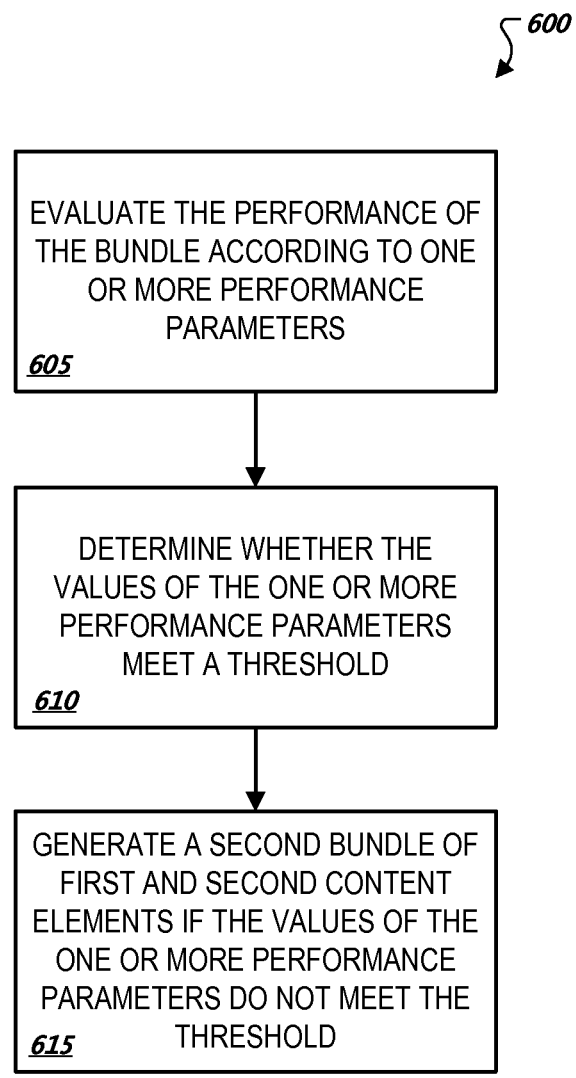
FIG. 6 is a flow diagram of an example process for monitoring the performance of a bundle of first content elements and second content elements.

FIG. 6 is a flow diagram of an example process 600 for monitoring the performance of a bundle of first content elements and second content elements. The process 600 can, for example, be implemented in the monitoring engine 135. In one implementation, the monitoring engine 135 can be integrated into the bundle generator system 100. In another implementation, the monitoring engine 135 can be integrated into the content page 105.

Stage 605 evaluates the performance of the bundle according to one or more performance parameters, such as an aggregate click-through rate, a click-to-play rate, an aggregate cost, and a consumption, and represented in FIG. 5. For example, a monitoring engine 135 can be utilized to measure the performance of the bundle according to one or more performance parameters.

Stage 610 determines whether the values of the one or more performance parameters meet a threshold. The threshold values for the one or more performance parameters can be designated based on the preferences of the content page 105. The measured values of the performance parameters from Stage 605 can be compared to these threshold values.

Stage 615 generates a second bundle of first content elements and second content elements if the values of the one or more performance parameters do not meet a threshold. For example, after comparing the measured values of the performance parameters to the threshold values with a monitoring engine 135, the bundle analysis engine 110 can determine whether a second bundle should be generated that includes elements that meet certain threshold values.

Other processes for monitoring the performance of a bundle of first content elements and second content elements can also be used.

Figure 7:
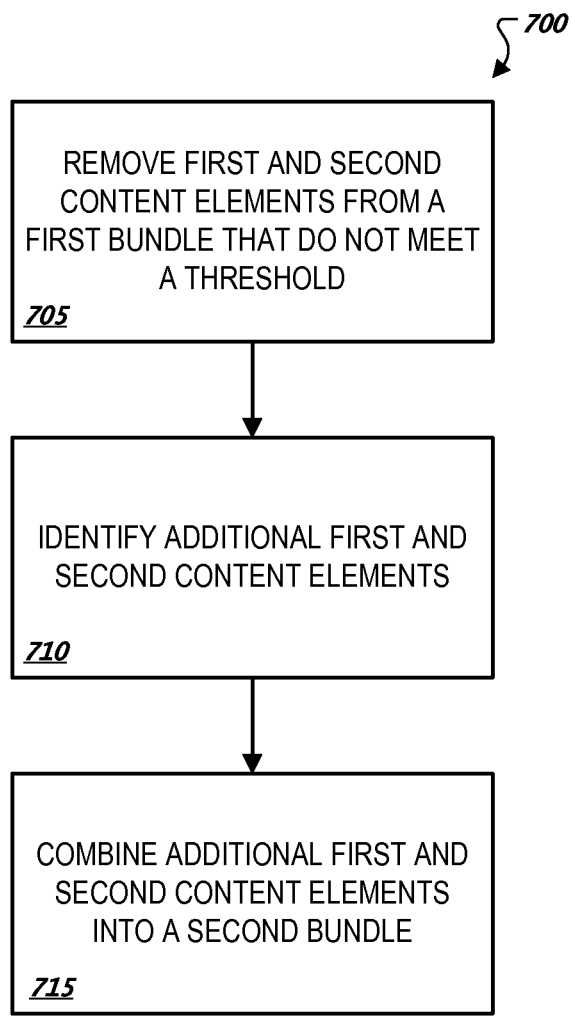
FIG. 7 is a flow diagram of an example process for adjusting a first bundle of first content elements and second content elements to generate a second bundle of first content elements and second content elements.

FIG. 7 is a flow diagram of an example process 700 for adjusting a first bundle of first content elements and second content elements to generate a second bundle of first content elements and second content elements. The process 700 can, for example, be implemented in the bundle analysis engine 110. In one implementation, the bundle analysis engine 110 can be integrated into the bundle generator system 100. In another implementation, the bundle analysis engine 110 can be integrated into the content page 105.

As represented in FIG. 6, the first content elements and second content elements are evaluated to determine whether they meet certain threshold values with regards to one or more performance parameters. Stage 705 removes first content elements and second content elements from a first bundle that do not meet a threshold. For example, the bundle analysis engine 110 can remove the first content elements and second content elements from a first bundle based on the evaluation by a monitoring engine 135.

Stage 710 identifies additional first content elements and second content elements. The additional first content elements and second content elements can be identified utilizing the same processes that can be used to initially identify the first content elements and second content elements to include in the first bundle. For example, the additional first content elements 115 and second content elements 120 can be identified with a bundle analysis engine 110.

Stage 715 combines additional first content elements and second content elements into a second bundle. For example, after identifying additional first content elements and second content elements, a bundler 130 can be utilized to combine the additional first content elements and second content elements into a second bundle.

Other processes for adjusting a first bundle of first content elements and second content elements to generate a second bundle of first content elements and second content elements can also be used.

Figure 8:
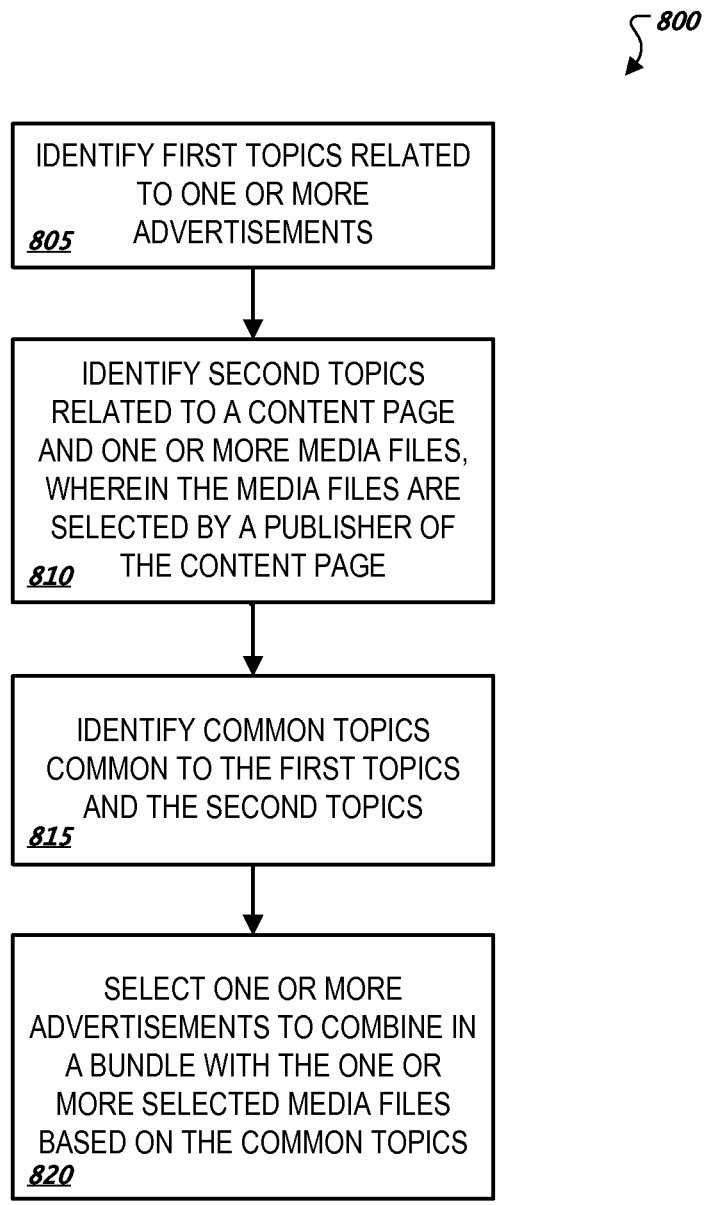
FIG. 8 is a flow diagram of an example process for generating a bundle of content from advertisements and selected media files.

FIG. 8 is a flow diagram of an example process 800 for generating a bundle of content from advertisements and selected media files. The process 200 can, for example, be implemented in the bundle analysis engine 110. In one implementation, the bundle analysis engine 110 can be integrated into the bundle generator system 100. In another implementation, the bundle analysis engine 110 can be integrated into the content page 105.

Stage 805 identifies first topics related to one or more advertisements. For example, the first topics 107 can be identified with a topics engine 125 that analyzes signals from the one or more advertisements 160, wherein the signals can include relevant keywords related to the advertisements. The identified relevant keywords can be ranked by the topics engine 125 to generate the first topics 180. The first topics 180 can also include one or more items transmitted from a publisher associated with the advertisements 160.

Stage 810 identifies second topics related to a content page and one or more media files, wherein the media files are selected by a publisher of the content page. The content page 105 can be a web page that publishes a variety of different content, e.g. video, audio, text, advertisements, news feeds, digital print, images, etc. The media files 155 can be selected by the publisher of the content page 105 to be displayed on the content page 105. In one implementation, the publisher can select a list of particular media files 155 to be displayed. In another implementation, the publisher can, for example, select media files 155 that are associated with a particular provider, genre, keyword, etc.

Stage 815 identifies common topics that are common to the first topics and the second topics. For example, the common topics can be identified by the topics engine 125 by combining the rankings from the first topics 180 and the second topics 175.

Stage 820 selects one or more advertisements to combine in a bundle with the one or more selected media files based on the common topics. For example, a bundler 130 can generate the bundle 140 after a bundle analysis engine 110 has selected the one or more advertisements 160 to combine with the selected media files 155.

Other processes for generating a bundle of content from first content elements and second content elements can also be used.

Figure 9:
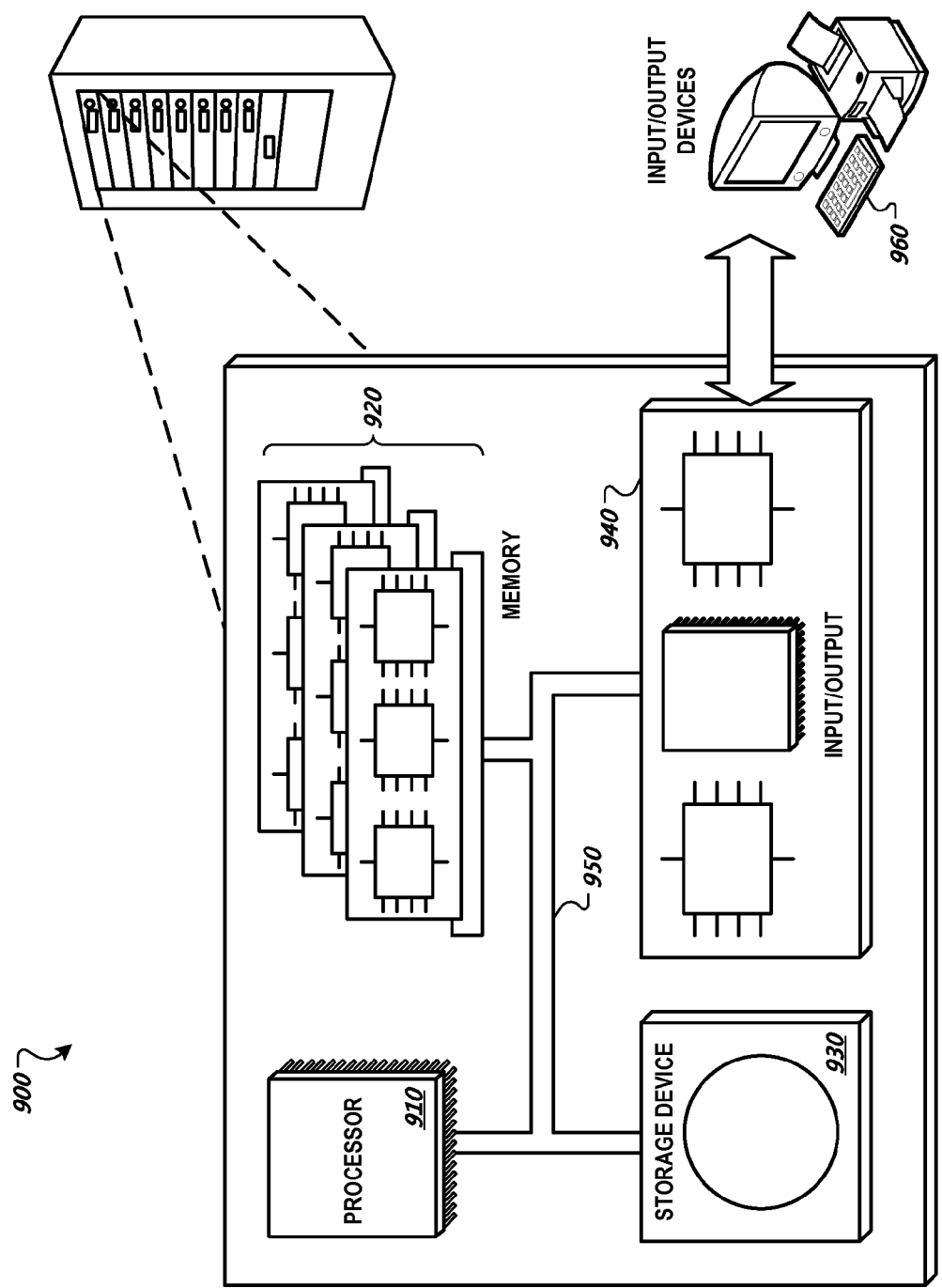
FIG. 9 is block diagram of an example computer system.

FIG. 9 is block diagram of an example computer system 900. The example computer system 900 can be utilized to implement a server computer device and/or a client computer device, or some other computer device. In one implementation, the example computer system 900 can be utilized to implement the content page 105 and bundle generator system 100 of FIGS. 1A and 1C.

The system 900 includes a processor 910, a memory 920, a storage device 930, and an input/output device 940. Each of the components 910, 920, 930, and 940 can, for example, be interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 can, for example, include a hard disk device, an optical disk device, or some other large capacity storage device.

The input/output device 940 provides input/output operations for the system 900. In one implementation, the input/output device 940 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 960.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art can effect alterations, modifications and variations to the examples without departing from the scope of the invention.

What is claimed is:

1. A computer-implemented method comprising:
identifying first topics related to a content page that is configured to be displayed on client device;
identifying second topics associated with available advertisements (i) that include advertisements with static content and advertisements with audio or video content and (ii) that are available to be selected, by one or more computers, for display on the content page on the client device;
identifying common topics that are related to each of the first topics and the second topics;
based on the common topics, identifying a first group of advertisements from the advertisements with static content and a second group of advertisements from the advertisements with audio or video content;
determining a total number of advertisements to include in an advertisement bundle of advertisements that includes advertisements from each of the first group and the second group;
based on relevance to the common topics and on revenue generated by presenting the advertisement bundle, determining a ratio of advertisements from the first group to advertisements from the second group to include in the advertisement bundle;
based on at least one of a click-through rate of the first advertisement or a cost to an advertiser of the first advertisement, determining a performance score for a first advertisement included in the advertisement bundle, the performance score based on presentations of the first advertisement on other content pages in a similar category as the content page, the click-through rate corresponding to a portion of users that visited a landing page of the advertisement by clicking on the first advertisement;

determining that the performance score for the first advertisement does not satisfy a threshold;

based on determining that the performance score for the first advertisement does not satisfy the threshold, replacing the first advertisement with an additional advertisement from a same group as the first advertisement to create an updated advertisement bundle, wherein the same group is one of the first group or the second group that included the first advertisement; and providing, to the client device, the updated advertisement bundle including the additional advertisement for display on the content page.

2. The method of claim 1, comprising:
determining that a performance score for the advertisement bundle does not satisfy a bundle threshold;
wherein replacing the first advertisement with an additional advertisement from the available advertisements to create an updated advertisement bundle comprises a second advertisement from the advertisement bundle to create the updated advertisement bundle.

3. The method of claim 2, wherein determining that a performance score for the advertisement bundle does not satisfy a bundle threshold comprises determining a performance score for the advertisement bundle according to an aggregate cost of the advertisements included in the advertisement bundle.

4. The method of claim 2, wherein determining that a performance score for the advertisement bundle does not satisfy a bundle threshold comprises determining a performance score for the advertisement bundle according to an aggregate click-through rate of the advertisements included in the advertisement bundle.

5. The method of claim 1, wherein the advertisement bundle is generated further based on a ranking of the common topics.

6. The method of claim 1, wherein replacing the first advertisement with an additional advertisement from the same group as the first advertisement to create an updated advertisement bundle is further based on topics that are provided by a publisher of the content page.

7. The method of claim 1, wherein the advertisements with static content only include text and images.

8. The method of claim 1, comprising:
based on relevance to the common topics or on revenue generated by presenting the advertisement bundle, determining an order of presentation to the user for the advertisements in the advertisement bundle.

9. The method of claim 1, wherein the advertisement bundle is presented in a video player,
wherein the advertisements from the first group are displayed adjacent to the video player, and
wherein the advertisements from the second group are displayed in the video player.

10. A system comprising:
one or more computers and one or more storage devices storing instructions that are operable, when executed by the one or more computers, to cause the one or more computers to perform operations comprising:

identifying first topics related to a content page that is configured to be displayed on client device;

identifying second topics associated with available advertisements (i) that include advertisements with static content and advertisements with audio or video content and (ii) that are available to be selected, by one or more computers, for display on the content page on the client device;

identifying common topics that are related to each of the first topics and the second topics;

based on the common topics, identifying a first group of advertisements from the advertisements with static content and a second group of advertisements from the advertisements with audio or video content;

determining a total number of advertisements to include in an advertisement bundle of advertisements that includes advertisements from each of the first group and the second group;

based on relevance to the common topics and on revenue generated by presenting the advertisement bundle, determining a ratio of advertisements from the first group to advertisements from the second group to include in the advertisement bundle;

based on at least one of a click-through rate of the first advertisement or a cost to an advertiser of the first advertisement, determining a performance score for a first advertisement included in the advertisement bundle, the performance score based on presentations of the first advertisement on other content pages in a similar category as the content page, the click-through rate corresponding to a portion of users that visited a landing page of the advertisement by clicking on the first advertisement;

determining that the performance score for the first advertisement does not satisfy a threshold;

based on determining that the performance score for the first advertisement does not satisfy the threshold, replacing the first advertisement with an additional advertisement from a same group as the first advertisement to create an updated advertisement bundle, wherein the same group is one of the first group or the second group that included the first advertisement; and providing, to the client device, the updated advertisement bundle including the additional advertisement for display on the content page.

11. The system of claim 10, wherein the operations further comprise:
determining that a performance score for the advertisement bundle does not satisfy a bundle threshold;
wherein replacing the first advertisement with an additional advertisement from the available advertisements to create an updated advertisement bundle comprises a second advertisement from the advertisement bundle to create the updated advertisement bundle.

12. The system of claim 11, wherein determining that a performance score for the advertisement bundle does not satisfy a bundle threshold comprises determining a performance score for the advertisement bundle according to an aggregate cost of the advertisements included in the advertisement bundle.

13. The system of claim 11, wherein determining that a performance score for the advertisement bundle does not satisfy a bundle threshold comprises determining a performance score for the advertisement bundle according to an aggregate click-through rate of the advertisements included in the advertisement bundle.

14. The system of claim 10, wherein the advertisement bundle is generated further based on a ranking of the common topics.

15. The system of claim 10, wherein replacing the first advertisement with an additional advertisement from the same group as the first advertisement to create an updated advertisement bundle is further based on topics that are provided by a publisher of the content page.

16. A non-transitory computer-readable medium storing software comprising instructions executable by one or more computers which, upon such execution, cause the one or more computers to perform operations comprising:
- identifying first topics related to a content page that is configured to be displayed on client device;
- identifying second topics associated with available advertisements (i) that include advertisements with static content and advertisements with audio or video content and (ii) that are available to be selected, by one or more computers, for display on the content page on the client device;
- identifying common topics that are related to each of the first topics and the second topics;
- based on the common topics, identifying a first group of advertisements from the advertisements with static content and a second group of advertisements from the advertisements with audio or video content;
- determining a total number of advertisements to include in an advertisement bundle of advertisements that includes advertisements from each of the first group and the second group;
- based on relevance to the common topics and on revenue generated by presenting the advertisement bundle, determining a ratio of advertisements from the first group to advertisements from the second group to include in the advertisement bundle;
- based on at least one of a click-through rate of the first advertisement or a cost to an advertiser of the first advertisement, determining a performance score for a first advertisement included in the advertisement bundle, the performance score based on presentations of the first advertisement on other content pages in a similar category as the content page, the click-through rate corresponding to a portion of users that visited a landing page of the advertisement by clicking on the first advertisement;
- determining that the performance score for the first advertisement does not satisfy a threshold;
- based on determining that the performance score for the first advertisement does not satisfy the threshold, replacing the first advertisement with an additional advertisement from a same group as the first advertisement to create an updated advertisement bundle, wherein the same group is one of the first group or the second group that included the first advertisement; and
- providing, to the client device, the updated advertisement bundle including the additional advertisement for display on the content page.

17. The medium of claim 16, wherein the operations further comprise:
- determining that a performance score for the advertisement bundle does not satisfy a bundle threshold;
- wherein replacing the first advertisement with an additional advertisement from the available advertisements to create an updated advertisement bundle comprises a second advertisement from the advertisement bundle to create the updated advertisement bundle.

18. The medium of claim 17, wherein determining that a performance score for the advertisement bundle does not satisfy a bundle threshold comprises determining a performance score for the advertisement bundle according to an aggregate cost of the advertisements included in the advertisement bundle.

19. The medium of claim 16, wherein the advertisement bundle is generated further based on a ranking of the common topics.

20. The medium of claim 16, wherein replacing the first advertisement with an additional advertisement from the same group as the first advertisement to create an updated advertisement bundle is further based on topics that are provided by a publisher of the content page.

* * * * *